(12) United States Patent
Ullmann et al.

(10) Patent No.: US 7,254,638 B2
(45) Date of Patent: Aug. 7, 2007

(54) METHOD AND APPARATUS FOR IDENTIFYING SLOW LINKS AND FOR PROVIDING APPLICATION-BASED RESPONSES TO SLOW LINKS IN A DISTRIBUTED COMPUTER NETWORK

(75) Inventors: Lorin Evan Ullmann, Austin, TX (US); Ching-Jye Chang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1297 days.

(21) Appl. No.: 09/737,368

(22) Filed: Dec. 15, 2000

(65) Prior Publication Data

US 2002/0112050 A1    Aug. 15, 2002

(51) Int. Cl.
*G06F 15/16* (2006.01)
*G06F 15/177* (2006.01)
*G06F 15/173* (2006.01)

(52) U.S. Cl. ............ 709/233; 709/201; 709/221; 709/224

(58) Field of Classification Search ........ 709/200–203, 709/217–228, 229–244
See application file for complete search history.

(56) References Cited

U.S. PATENT DOCUMENTS

| | | | |
|---|---|---|---|
| 5,606,669 A * | 2/1997 | Bertin et al. ................ | 709/223 |
| 5,659,787 A | 8/1997 | Schieltz et al. ........ | 395/200.56 |
| 5,818,845 A | 10/1998 | Moura et al. ............... | 370/449 |
| 5,961,594 A * | 10/1999 | Bouvier et al. ............. | 709/223 |
| 6,049,549 A | 4/2000 | Ganz et al. .................. | 370/449 |
| 6,118,761 A | 9/2000 | Kalkunte et al. ........... | 370/229 |
| 6,151,696 A * | 11/2000 | Miller et al. ................ | 714/748 |
| 6,215,774 B1 * | 4/2001 | Knauerhase et al. ........ | 370/252 |
| 6,401,127 B1 * | 6/2002 | Lei et al. ..................... | 709/235 |
| 6,529,957 B1 * | 3/2003 | Joergensen .................. | 709/233 |
| 6,578,077 B1 * | 6/2003 | Rakoshitz et al. .......... | 709/224 |

(Continued)

FOREIGN PATENT DOCUMENTS

JP    10294749    11/1998

(Continued)

OTHER PUBLICATIONS

"Traffic Engineering Management", Cisco, Sep. 19, 2000, pp. 1-29.*

*Primary Examiner*—Nathan J. Flynn
*Assistant Examiner*—Haresh Patel
(74) *Attorney, Agent, or Firm*—Jeffrey S. LaBaw; Anne V. Dougherty (57) ABSTRACT

A system and method for programming applications to respond to slow links. The programming may be done during configuration of a system, or it may be implemented dynamically in response to a recently-detected change in network performance. The method includes the steps of continually monitoring links in a network, periodically calculating runtime link speeds for the links, and identifying slow links based on the monitoring and calculating. The method may additionally include the preliminary step of predefining so-called original link speed factors for the links. Runtime determination of runtime link speed factors for the respective links and comparison of the original link speed factors to the real-time link speed factors will then be used for the identification of slow links. A variety of application responses may be programmed as slow link responses.

18 Claims, 4 Drawing Sheets

U.S. PATENT DOCUMENTS

| | | |
|---|---|---|
| 6,587,431 B1 * | 7/2003 | Almulhem et al. ......... 370/229 |
| 6,601,195 B1 * | 7/2003 | Chirashnya et al. .......... 714/43 |
| 6,657,987 B1 * | 12/2003 | Kumar et al. ............... 370/346 |
| 6,728,216 B1 * | 4/2004 | Sterner ....................... 370/252 |
| 6,738,819 B1 * | 5/2004 | Li et al. ..................... 709/229 |
| 6,757,320 B2 * | 6/2004 | Tiedemann et al. ......... 375/141 |
| 6,807,156 B1 * | 10/2004 | Veres et al. ................. 370/252 |
| 6,975,604 B1 * | 12/2005 | Ishida et al. ................ 370/331 |
| 2002/0054567 A1 * | 5/2002 | Fan ............................ 370/230 |

FOREIGN PATENT DOCUMENTS

JP            10327148           12/1998

\* cited by examiner

METHOD AND APPARATUS FOR IDENTIFYING SLOW LINKS AND FOR PROVIDING APPLICATION-BASED RESPONSES TO SLOW LINKS IN A DISTRIBUTED COMPUTER NETWORK

FIELD OF THE INVENTION

This invention relates to distributed networks and more particularly to the identification and handling of slow network links by distributed kernel services.

BACKGROUND OF THE INVENTION

Communications in computing systems are restricted by the limitations of the available components, including not only the computing capacity but also the limitations along the communications media. Single closed systems are bound by the CPU speed and the size of the memory. In client-server systems having a single server, the transactions are bounded by the bandwidth of the network along with the CPA and memory of the server. In multi-server distributed networks, where distributed kernel services (DKS) and object request brokers are provided to handle requests, the factors influencing communications are multiplied. Not only are there endpoint restrictions (i.e., capacity of the hardware or software at an endpoint) multiplied by the number of endpoints, which may be in the millions, but also link speed restrictions multiplied by the number of links in the route for a given communications, and influenced by the amount of traffic over the route.

In distributed networks, the link speed between endpoints necessarily affects the speed of transmissions between the endpoints as well as the quality of those transmissions. In anticipation of slow links, some applications are preset to "assume" that the links are slow and the application's requests and transmission rates are scaled accordingly. Such is a typical practice in local area networks (LANs). In other point-to-point systems, the link speed (e.g., based on the modem speed at a client endpoint) is requested at the outset of communications and the application's responses are dynamically adapted to optimize usage of the anticipated link speed. In still other point-to-point systems, such as in the case of streaming audio and video players, the bandwidth of the connection, along with the capacity of the equipment at the receiving endpoint, are factored in to anticipate the link speed for communications and hence the streaming rate. On a point-to-point basis some applications (specifically those with SNMP device drivers) can poll to obtain the interface speed at an endpoint or can apply "ping" tests to measure the response time across a link between two endpoints. Those measurements can then be considered when tailoring the transaction to the available link speed. While the foregoing solutions are realistic for small scale point-to-point systems, they are not scalable for use in vast distributed networks where there may be one million endpoints. Moreover, those applications which can obtain interface speeds may have "stale" information; and, those applications without the ability to gather interface speed must blindly program with only InetAddresses. Often, a local server is required in each part of a network which is connected by a slow link to other distributed kernel services of the network. Since a local server is provided, all reads are done locally, with the slow link only being used for writes.

Delays caused by high network traffic are exacerbated by applications which continually poll for the status of the interface or link speed and the status of their pending requests, thereby further reducing overall network performance. In addition, when system administrators learn of system outages, the ability to limit traffic, for example by creating slow or time sensitive links, must be done automatically by automatic programming interfaces (APIs). When events occur, whether due to volume or outages, applications continue to poll the link and do not gracefully quit using a network resource. As a result, an error prone system of tuning each application's use of the network must be implemented, rather than providing a way for an application to determine link speed, by query or by automatic notification of a significant change in link speed, and then respond accordingly (e.g., decide whether or not to attempt to perform a task).

What is desirable, therefore, and what is an object of the present invention is to provide a system and method of application programming to define responses to the existence of a slow link or system outage.

It is another object of the invention to provide a system and method for comparing link speeds in a network for use in tailoring network usage to optimize network performance.

Still another object of the invention is to provide a system and method for dynamically modifying application programming to respond to a detected change in network conditions.

SUMMARY OF THE INVENTION

The foregoing and other objects are realized by the present invention which includes a system and method for programming applications to respond to slow links. The programming may be done during configuration of a system, or it may be implemented dynamically in response to a recently-detected change in network performance. The method includes the steps of continually monitoring links in a network, periodically calculating runtime link speeds for the links, and identifying slow links based on the monitoring and calculating. The method may additionally include the preliminary step of predefining so-called original link speed factors for the links. Runtime determination of runtime link speed factors for the respective links and comparison of the original link speed factors to the real-time link speed factors will then be used for the identification of slow links. A variety of application responses may be programmed as slow link responses.

BRIEF DESCRIPTION OF THE DRAWINGS

The invention will now be described in greater detail with specific reference to the appended drawings wherein.

DESCRIPTION OF THE PREFERRED EMBODIMENT

The present invention can be implemented in any network with multiple servers and a plurality of endpoints; and is particularly advantageous for vast networks having hundreds of thousands of endpoints and links there between.

Figure 1:
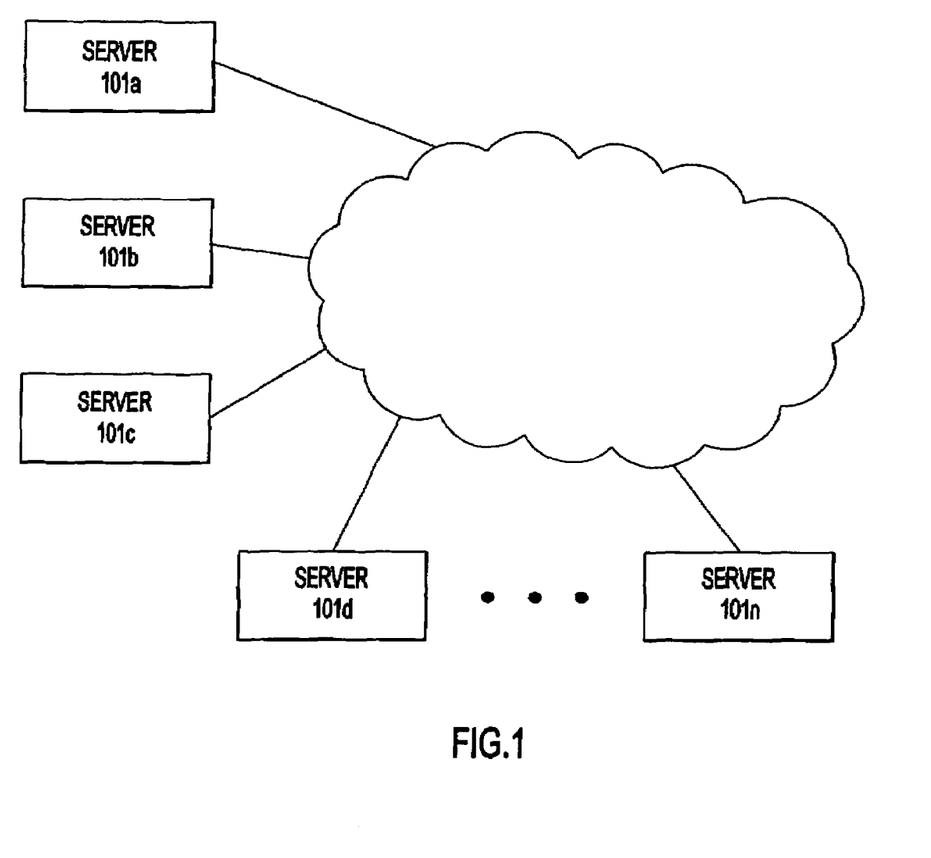
FIG. 1 provides a schematic diagram of a network in which the present invention can be implemented.

FIG. 1 provides a schematic illustration of a network for implementing the present invention. Among the plurality of servers, 101a-101n as illustrated, at least one of the servers, 101a in FIG. 1, which already has some of the distributed kernel services (DKS) is designated as one of the control servers for the purposes of implementing the invention. A network has many endpoints, with endpoint being defined, for example, as one Network Interface Card (NIC) with one MAC address, IP Address which may be found in one of the servers 101b-101n or other computers 102a-102c. The control server 101a in accordance with the present invention has the components illustrated in FIG. 2, as part of the distributed kernel services, for providing a method including the steps of: defining link speed factors for links in the network topology; using link speed factors to identify slow links; and, defining and implementing application-based responses to detected slow links. The link speed factors may be simply endpoint data such as NIC speed, link data such as link speed, route data for a plurality of links, or some factor which is calculated from the foregoing and other network performance indicators.

Figure 2:
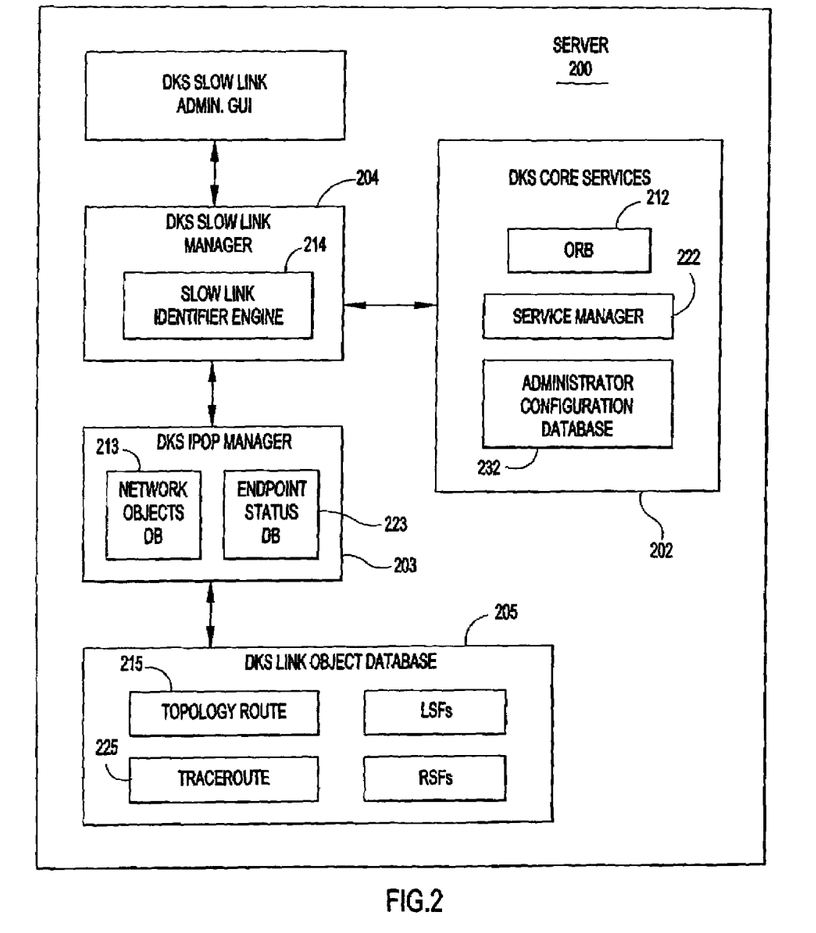
FIG. 2 provides a schematic diagram of the components of a network server entity for implementing the present invention.

As shown in FIG. 2, the server 200 includes the already available DKS core services at component 202, which services include the object request broker (ORB) 212, service manager 222, and the Administrator Configuration Database 232, among other standard DKS services. The DKS Internet Points of Presence (IPOP) Manager 203 provides the functionality for gathering network data, as is detailed in the co-pending patent application entitled "METHOD AND SYSTEM FOR MANAGEMENT OF RESOURCES LEASES IN AN APPLICATION FRAMEWORK SYSTEM", Ser. No. 09/738,307, filed Dec. 15, 2000, the teachings of which are incorporated by reference herein. In accordance with the functionality of the DKS IPOP, endpoint and link data are gathered for use by the DKS Slow Link Manager 204, the functions of which are further detailed below. The endpoint and link information gathering may include existing functionality such as SNMP queries for Network Interface Card (NIC) speed which will return speed data from NICs such as Ethernet cards or the like having the capability to respond to such queries. Another feature of existing network components includes the ability to generate and register responses from so-called "pings" between multiple links or endpoints to gauge the response time between two links. A Network Objects database 213 and an Endpoint Status database 223 are provided at the DKS IPOP Manager 203 for storing the information which has been gathered. Additional information which will be stored, for example at the Endpoint Status database 223, includes notifications of device failure and the like.

Another existing service of the DKS is the topology polling engine at 233 of block 203 which is provided, in the form of an Internet Protocol (IP) driver, to discover the physical network as a service of DKS. The topology engine discovers the endpoints, links between endpoints, and routes comprising a plurality of links, and provides the topology map for storage in the DKS link object database 205. While storage of topology data had been available in the past, the illustrated system includes the storage at the DKS Link Object Database 205 purely for simplicity of description, although clearly existing storage can be accessed for use by the present invention. Specifically illustrated are a storage location for the Topology Routes between Endpoint ORBS at 215 and the Traceroute of other Native Operating System (OS) route generator for non-ORB Endpoints at 225. Clearly the location of the physical storage is not critical to the functionality of the inventive process, provided that the information is made available for use by the Slow Link Identifier Engine 214 of the DKS Slow Link Manager 204.

The DKS Slow Link Manager 204 uses the topology maps, along with the link and endpoint information gathered by the DKS IPOP Manager 203 to arrive at Link Speed Factors (LSFs) and Route Speed Factors (RSFs) for each of the links and routes in the network topology. The LSFs and RSFs are also stored at the DKS Link Object Database for comparative use, as will be discussed below with reference to FIGS. 3 and 4. As stated above, the terms LSF and RSF are intended to encompass a plurality of measures.

Finally, the DKS server components at 200 include a DKS Slow Link Administrative Graphical User Interface (GUI) which can create displays in response to input from the DKS Slow Link Manager 204 in order to display for a system administrator a slow link topology map for the network. The GUI will not only be able to display the slow link information, but will also be adapted to receive user (i.e., system administrator) input for directing applications responses to slow link detection both during network configuration and dynamically during network operations.

Figure 3:
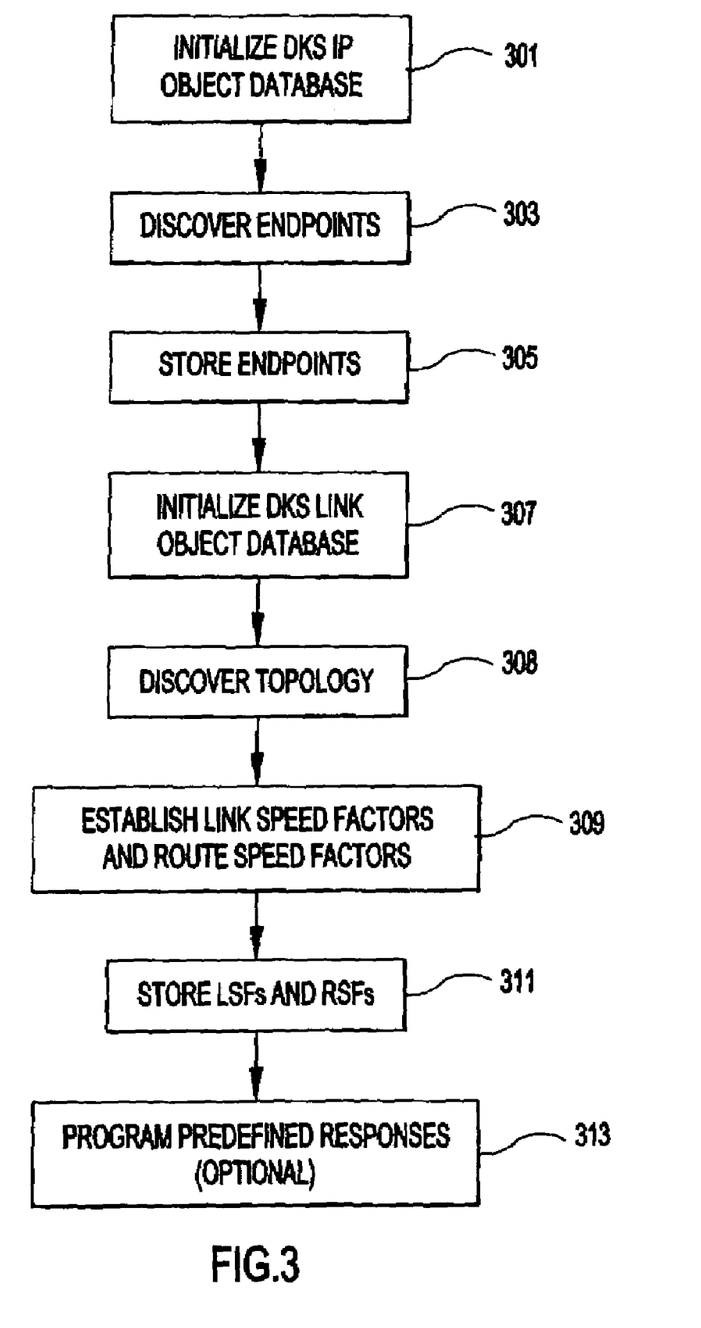
FIG. 3 provides a representative process flow for one aspect of the invention.

The process flow for a first aspect of the present invention is provided in FIG. 3. When configuring a network, the DKS IP Network Object Database 213 will be initialized at 301 by discovering all the network entities which comprise a physical network. Next, the network interconnections are analyzed in order to discovery and store the network topology in the physical network topology database 233 at 303. When all endpoints have been identified, the operational status for each of the endpoints is stored in the Endpoint Status Database 223 at step 305. Next, the DKS Link Object Database is initialized at 307, followed by step 308 wherein the links between endpoints are established using the physical network topology database 224. The so-called "original" or predicted speed of each link is established by the DKS Slow Link Manager 204 and Link Speed Factors (LSFs) and Route Speed Factors (RSFs) are assigned at step 309 using the aforementioned NIC speed queries, ping responses and/or a combination of the foregoing and other network performance indicators. The LSFs and RSFs are stored at 311 in the DKS Link Object Database 205 for later use.

Pseudo-code for implementing the foregoing is set forth below:

```
Initialize DKS IP Object Database with Network Objects
    Get Discovery Seed Endpoint
    Loop through all Seeds to Discovery Active Endpoints
        Do Snmp Get for Seed
        Get All Endpoints Seed has communicated With
        Perform Loop with all seeds and endpoints seed has communicated with:
        IS Seed active (check with ping) and Not already in IPOP ?
            If yes:
                Get Network for Endpoint
```

```
                Is Network Stored in IPOP?
                    If no → store Network Object in IPOP
                    If yes → continue
                GetSystem for Endpoint
                Is System Stored in IPOP?
                    If no → store System Object in IPOP
                        Get Link Speed for Endpoints NIC (SNMP IF Table)
                        Store IF Speed for Endpoint's NIC
                    If yes → continue
            If no: continue with next seed or endpoint
    Store Endpoints in IPOP Database
Initialize DKS Link Object Database with Network Objects
    Get Discovery Seed Endpoint
    Get all Endpoints
    Enter Endpoint Loop
    Get First Endpoint (EP1)
        Does Topology Have EP1 ?
            If yes: Get all Endpoints (EPn) connected to EP1
                Create Link using EP1 and each N Endpoint
            If no: Get connections from other OS native source
                    Get all Endpoints (EPn) connected to EP1
                    Create Link using EP1 and each N Endpoint
    Continue to next Endpoint
Class LinkSpeed {
    //constants Example Only
    long FASTLINKPINGRESPONSE = 5;
    long SLOWLINKPINGRESPONSE = 100;
    long FASTNIC = 100; //bps
    long SLOWNIC = 10;
}
Class Link {
    //data
    Endpoint Ep1;
    Endpoint Ep2;
    //Speed of NIC card in Endpoint
    Long    EP1NICSpeed;
    Long    EP2NICSpeed;
    //Ping from Know Endpoint within same Network as Endpoint
    //Typically represent local network speed between a local endpoint
    Long    baselinePingEP1Test;
    Long    baselinePingEP2Test;
    Long    lastPingLinkTest;
    //store all endpoints between EP1 and Ep2
    //For Example (EP1→EP3→EP4→Ep2) where EP3 and Ep4 are gateways
    Vector  linkRoute;
    //linkSpeed for all links in Route
    //For Example (EP1→EP3, EP3→EP4, EP4→EP2) where EP2 and Ep4 are gateways
    Vector  linkSpeedsforlinkRoute
    //get, set methods for above data
    // .....
}
```

Knowing the network topology and the LSFs and RSFs for the network, the DKS Slow Link Manager can solicit input from the system administrator to identify and implement appropriate responses to a future event comprising slow link detection. The DKS Slow Link GUI will invite system administrator input to either predefine or dynamically define network application responses to slow link events. For example, an application may be programmed to adapt its operations to the slow link by either stopping polling or at least slowing its polling activity when notified of the detection of a slow link. Another programmed application response may be to limit the transaction types, such as having the application only perform read operations until notified that the link speed has improved. Still another response which the system administrator may dictate is to limit which applications may use the link once it has been declared to be a slow link. The step 311 of programming predefined responses in FIG. 3 is denoted as optional at the configuration stage since the responses could be dynamically determined at runtime, if so desired. It is suggested that predefining system and application responses will, however, ameliorate the speed problem much more quickly than will a runtime approach.

Figure 4:
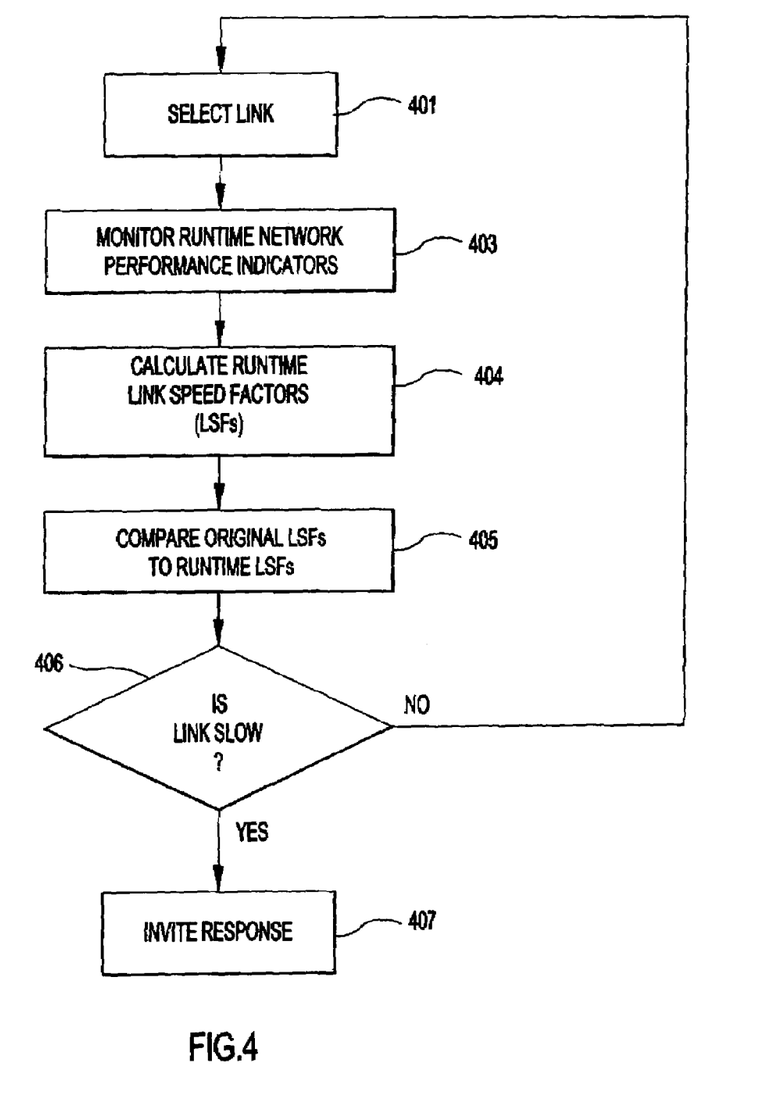
FIG. 4 provides a representative process flow for another aspect of the present invention.

Having arrived at the LSFs and RSFs, the DKS Slow Link Manager can characterize link speed at any time during operation by measuring the runtime link speeds, arriving at runtime LSFs, and comparing the runtime values to the stored original values. FIG. 4 provides a runtime process flow for identifying slow links in accordance with the present invention. The process of monitoring link speeds may be conducted continually, rotating among links, or may be conducted selectively based on the network topology, expected applications' usage of specific links, and other criteria as may be established by the system administrator. Regardless of the criteria and timing, the process flow will comprise selecting links to be evaluated at 401 followed by monitoring runtime network performance indicators at 403. Once the runtime network performance indicators have been measured, runtime LSFs are calculated at 404 and compared to original LSFs. If the comparison does not result in a determination that the link speed is slow, the system moves on to select another link for evaluation. If, however, the comparison shows that the link is slow, as determined at decision box 406, a response is invited at 407. The response which may be invited includes displaying the network condition to a system administrator and prompting runtime input to address the performance condition; notifying applications of the detected slow link to prompt their automatic response (which have been pre-programmed by the system administrator); or, the DKS Slow Link Manager automatically changing network behaviors (e.g., by denying application access for some applications; by selectively advertising links based on LSF and RSF thresholds; by rerouting application requested to use endpoint which result in the use of another endpoint in order to avoid the slow link; or by presenting the ranked links, slow to fast, so as to help an application choose the best suited link for the task at hand) to address the slow link condition.

Pseudo code for the foregoing is shown below:

```
Runtime Execution to Identify Slow Links
    Admin identifies Eps (EP1, EP2) of interest
    GetLinkRoute for (EP1, EP2)
        //Check NIC Speeds
        Is EP1NICSPEED = or > SLOWNIC ?
            If yes return LINK is Slow to Admin
            If no continue
        Is EP2NICSPEED = or > SLOWNIC ?
            If yes return LINK is Slow to Admin
            If no continue
        //Check Pings within the network
        Is baselinePingEP1Test = or >SLOWLINKPINGRESPONSE ?
            If yes return LINK is Slow to Admin
            If no continue
        Is baselinePingEP2Test = or >SLOWLINKPINGRESPONSE ?
            If yes return LINK is Slow to Admin
            If no continue
        //Check EP1 to EP2 ping
        Is lastPingLinkTest = or > SLOWLINKPINGRESPONSE ?
            If yes return LINK is Slow to Admin
            If no continue
    Return LINK is FAST to Admin GUI
```

ADD RunTime Execution of response to slow links

And calculation of this factor

As disclosed herein, the present invention provides for dynamic detection of slow links and for a plurality of automatic responses to the detection of a slow link condition. The invention has been described with reference to several specific embodiments, including for example the use of link speed for detection of slow links. One having skill in the relevant art will recognize that modifications may be made to the teachings which are provided by way of example without departing from the spirit and scope of the invention as set forth in the appended claims.

Having thus described our invention, what we claim as new and desire to secure by Letters Patent is:

1. A computer implemented method for identifying slow links from a plurality of links of a distributed network comprising a plurality of computers having a plurality of endpoints, said endpoints being connected in said network by the plurality of links, the method comprising the steps of:

defining an original link speed factor by a system administrator with a predicted speed value of each of said plurality of links;

dynamically performing at least one runtime measurement of at least one runtime link speed indicator of each of said plurality of links;

calculating a runtime link speed factor based on said runtime measurement of at least one runtime link speed indicator of each of said plurality of links;

comparing the original link speed factor with the runtime link speed factor of each of said plurality of links;

designating at the least one link as a slow link when the runtime link speed factor satisfies a desired relationship to the original link speed factor; and notifying the system administrator by sending a notification to at least one of said plurality of computers about the at least one slow link.

2. The method according to claim 1, wherein a plurality of applications are running in said network and further comprising notifying at least one of said applications about at least one slow link.

3. The method according to claim 2 further comprising said at least one of said applications altering its usage of said at least one slow link.

4. The method according to claim 1 wherein a plurality of applications are running in said network and further comprising automatically altering application usage of the at least one slow link.

5. The method according to claim 1 further comprising said system administrator altering application usage of the at least one slow link.

6. A computer implemented method for dynamically adjusting application usage of links of a plurality of links of a distributed network comprising a plurality of computers having a plurality of endpoints, said endpoints being connected in said network by a plurality of links, the method comprising the steps of:

defining an original link speed factor by a system administrator with a predicted speed value of each of said plurality of links;

dynamically performing at least one runtime measurement of at least one runtime link speed indicator of each of said plurality of links;

calculating a runtime link speed factor based on said runtime measurement of at least one runtime link speed indicator of each of said plurality of links;

comparing the original link speed factor with the runtime link speed factor of each of said plurality of links;

designating at least one link as a slow link when the runtime link speed factor satisfies a desired relationship to the original link speed factor;

determining which specific applications require access to the at least one slow link; and adjusting application usage of the at least one slow link by said each of said specific applications.

7. The method according to claim 6 wherein said adjusting application usage comprises invoking preprogrammed application responses.

8. The method according to claim 6 wherein said adjusting application usage comprises the steps of:

notifying a system administrator of the at least one slow link; and said system administrator identifying specific actions to adjust application usage of said at least one slow link.

9. The method according to claim 6 further comprising the steps of:

a system administrator predefining and storing at least one application response to detection of at least one slow link in said distributed network; and retrieving said at least one application response for upon detection of said at least one slow link.

10. The method according to claim 6 wherein a plurality of applications are running in said network and further comprising automatically altering application usage of the at least one slow link.

11. Apparatus for identifying slow links from a plurality of links of a distributed network comprising a plurality of computers having a plurality of endpoints, said endpoints being connected in said network by a plurality of links comprising:

at least one storage location for storing an original link speed factor defined by a system administrator with a predicted speed value of each of said plurality of links;

at least one measurement component for dynamically performing at least one runtime measurement of at least one runtime link speed indicator of each of said plurality of links;

a processing component for calculating a runtime link speed factor based on said runtime measurement of at least one runtime link speed indicator of each of said plurality of links;

a comparator component for comparing the original link speed factor with the runtime link speed factor of each of said plurality of links; and wherein said processing component further comprises a component for designating at least one link as a slow link when the runtime link speed factor satisfies a desired relationship to the original link speed factor and for notifying a system administrator by generating and sending a notification to at least one of said plurality of computers about the at least one slow link.

12. The apparatus according to claim 11 wherein a plurality of applications are running in said network and wherein said apparatus further comprises a component for automatically altering application usage of the at least one slow link.

13. The apparatus according to claim 11 further comprising user input means for said system administrator to input instructions for altering application usage of the at least one slow link.

14. Apparatus for dynamically adjusting application usage of links from a plurality of links of a distributed network comprising a plurality of computers having a plurality of endpoints, said endpoints being connected in said network by a plurality of links comprising:

at least one storage location for storing an original link speed factor defined by a system administrator with a predicted speed value of each of said plurality of links;

at least one measurement component for dynamically performing at least one runtime measurement of at least one runtime link speed indicator of each of said plurality of links;

a processing component for calculating a runtime link speed factor based on said runtime measurement of at least one runtime link speed indicator of each of said plurality of links;

a comparator component for comparing the original link speed factor with the runtime link speed factor of each of said plurality of links; and wherein said processing component further comprises a component for designating at least one link as a slow link when the runtime link speed factor satisfies a desired relationship to the original link speed factor and a component for determining which specific applications requires access to said at least one slow link; and for adjusting application usage of at least one link by said each of said specific applications.

15. The apparatus according to claim 14 further comprising storage means for storing preprogrammed application responses to at least one slow link.

16. The apparatus according to claim 14 further comprising:

notification means for notifying a system administrator of the detection of at least one slow link; and user input means for said system administrator to input specific actions to adjust application usage said at least one slow link.

17. A program storage device readable by machine, embodying a program of instructions executable by the machine to perform a method for identifying slow links from a plurality of links of a distributed network comprising a plurality of computers having a plurality of endpoints, said endpoints being connected in said network by a plurality of links, said method comprising the steps of:

defining an original link speed factor by a system administrator with a predicted speed value of each of said plurality of links;

dynamically performing at least one runtime measurement of at least one runtime fink speed indicator of each of said plurality of links;

calculating a runtime link speed factor based on said runtime measurement of at least one runtime link speed indicator of each of said plurality of links;

comparing the original link speed factor to the runtime link speed factor of each of said plurality of links;

designating at least one link as a slow link when the runtime link speed factor satisfies a desired relationship to the original link speed factor; and notifying the system administrator by sending a notification to at least one of said plurality of computers about the at least one slow link.

18. A program storage device readable by machine, embodying a program of instructions executable by the machine to perform a method for dynamically adjusting application usage of links of a plurality of links of a distributed network comprising a plurality of computers having a plurality of endpoints, said endpoints being connected in said network by a plurality of links, said method comprising the steps of:

defining an original link speed factor by a system administrator with a predicted speed value of each of said plurality of links;

dynamically performing at least one runtime measurement of at least one runtime link speed indicator of each of said plurality of links;

calculating a runtime link speed factor based on said runtime measurement of at least one runtime link speed indicator of each of said plurality of links;

comparing the original link speed factor with the runtime link speed factor of each of said plurality of links;

designating at least one link as a slow link when the runtime link speed factor satisfies a desired relationship to the original link speed factor;

determining which specific applications require access to the at least one said detected slow link; and adjusting application usage of the at least one slow link by said each of said specific applications.

\* \* \* \* \*